United States Patent Office 3,132,160
Patented May 5, 1964

3,132,160
3,11-DIOXYGENATED-17-DESOXY-5β-ANDRO-
STANES AND PROCESSES THEREFOR
William J. Wechter, Kalamazoo, Mich., assignor to The
Upjohn Company, Kalamazoo, Mich., a corporation of
Delaware
No Drawing. Filed Feb. 4, 1963, Ser. No. 256,106
18 Claims. (Cl. 260—397.3)

This invention relates to certain novel steroid compounds and to processes for their preparation. It is especially concerned with 3,11-dioxygenated-17-desoxy-5β-androstanes and 3-esters thereof, e.g., 3(α and β)-hydroxy-17β-methyl-5β-androstan-11-one and 3-esters thereof; their corresponding 17β-ethyl, 17β-isopropyl and 17-methylene derivatives; their 11α-methyl-11β-hydroxy counterparts; the corresponding 3-keto derivatives of all of the foregoing 3-hydroxy compounds.

The novel compounds and processes of this invention are illustratively represented by the following sequence of formulae:

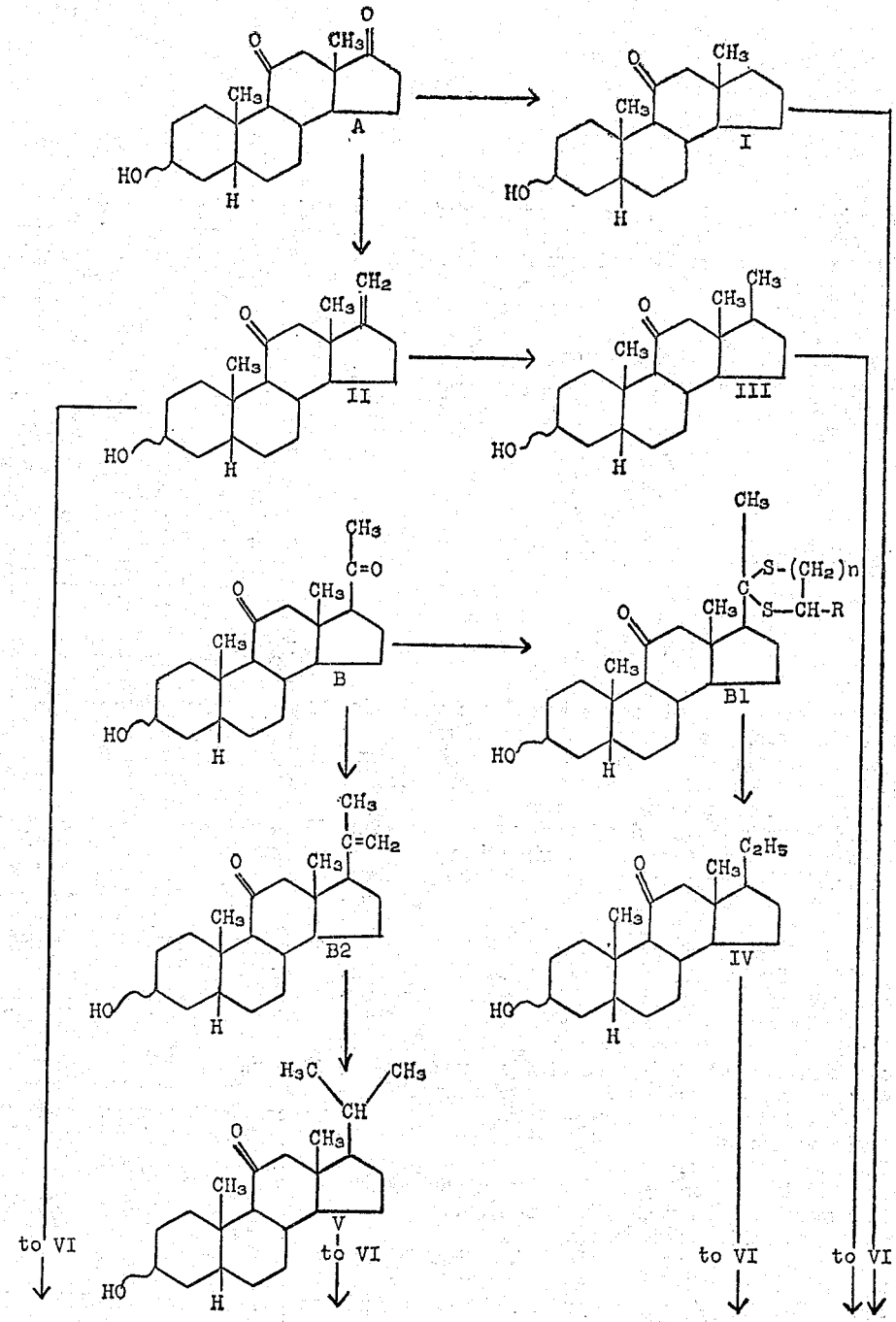

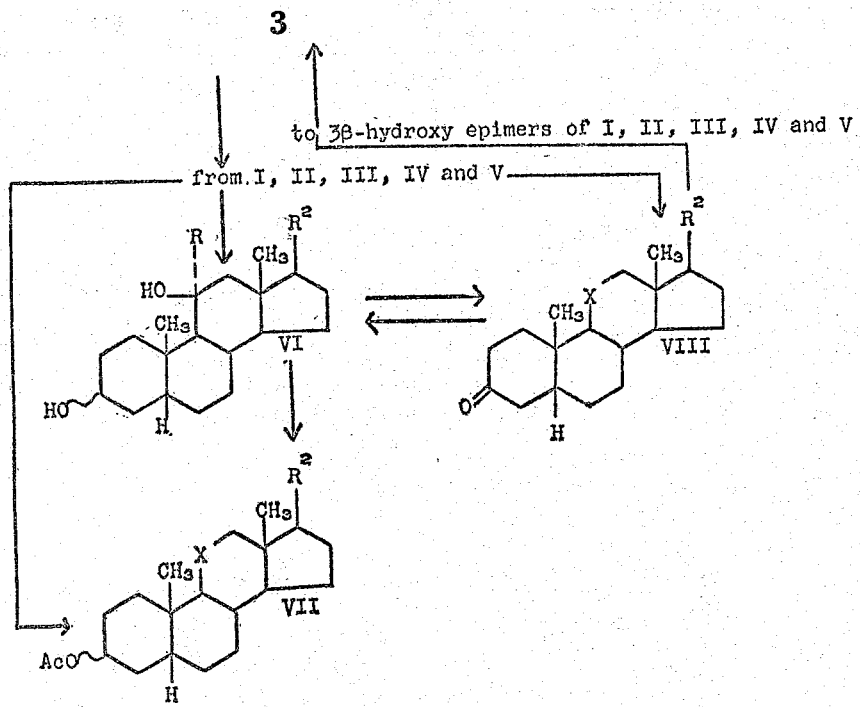

wherein ~ is a generic expression denoting α- and β-bonds and mixtures thereof; n is selected from the group consisting of the integers one and two; R is selected from the group consisting of hydrogen and a lower-alkyl radical containing from one to twelve carbon atoms, inclusive; Ac is the acyl radical of an organic carboxylic acid containing from one to twelve carbon atoms, inclusive; $R^2$ is selected from the group consisting of hydrogen, methylene, methyl, ethyl and isopropyl; X is selected from the group consisting of the β-hydroxymethylene radical

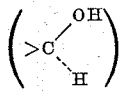

the β-hydroxy-α-methylmethylene radical

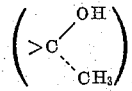

and the carbonyl radical ($>C=O$).

The novel compounds of the invention possess valuable pharmacological properties such as central nervous system depressing, analgetic, sedative, tranquilizing and muscle relaxing activities and consequently are useful in the treatment of nervous disorders, hypertension and related illnesses in valuable domestic animals. These compounds can be prepared and administered to mammals, birds and animals in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills or the like, preferably in unit dosage forms for simple administration or precise dosage. The liquid compositions can take the form of solutions, emulsions, suspensions, syrups or elixirs. The novel compounds potentiate the emulsifying efficiency of fats.

The novel compounds of this invention represented by Formulae I and II of the flow-sheet above are prepared from the known starting steroids embraced by Formula A, namely, 3α-hydroxy-5β-androstane-11,17-dione and its corresponding 3b-hydroxy epimer.

According to the process of this invention, in order to obtain 3(α or β)-hydroxy-5β-androstan-11-one (I), 3(α or β)-hydroxy-5β-androstane-11,17-dione (A) is subjected to conventional Wolff-Kishner reduction, e.g., by treating a compound of Formula A with hydrazine hydrate and potassium hydroxide in a high boiling solvent such as diethylene glycol. To prepare 3(α or β)-hydroxy-17-methylene-5β-androstan-11-one (II), a compound of Formula A is subjected to the Wittig reaction, e.g., by treatment with triphenylphosphene methylene. Reduction of a thus produced compound (II), e.g., by hydrogenation in the presence of a hydrogenation catalyst such as palladium, yields a 3(α or β)-hydroxy-17β-methyl-5β-androstan-11-one (III).

The compounds represented by Formulae IV and V are prepared from the starting steroids of Formula B. For example, 3(α or β)-hydroxy-5β-pregnane-11,20-dione (B) is converted to the corresponding 20-thioketal by reaction with an alkanedithiol (such as ethanedithiol) in the presence of an organic acid and a strong Lewis acid catalyst (such as boron trifluoride etherate) to give a 3(α or β)-hydroxy-5β-pregnane-11,20-dione 20-thioketal; hydrolysis of a thus produced compound yields a corresponding 3(α or β)-hydroxy compound (B1), e.g., 3(α or β)-hydroxy-5β-pregnane-11,20-dione 20-thioketal (B1). By employing the Mozingo desulfurization reaction, e.g., by hydrogenation of the 20-thioketal (B1) in the presence of a hydrogenation catalyst such as Raney nickel, a compound of Formula IV, e.g., 3(α or β)-hydroxy-17β-ethyl-5β-androstan-11-one (IV) is produced. The compounds of Formula B on being subjected to the Wittig reaction yield 3(α or β)-hydroxy-20-methylene-5β-pregnan-11-one (B2), reduction of a thus produced 20-methylene compound (B2), e.g., by hydrogenation in the presence of a hydrogenation catalyst such as palladium, yields a 3(α or β)-hydroxy-17β-isopropyl-5β-androstan-11-one (V).

The compounds of Formulae I, II, III, IV and V, produced in the manner indicated above, can be converted to the corresponding 11β-hydroxy-11α-hydrogen compounds represented by Formula VI. Subjecting the compounds embraced by Formulae I to V, inclusive, to strong chemical reduction, e.g., by treatment with sodium borohydride or lithium aluminum hydride yields, for example, 3(α and β),11β-dihydroxy-5β-androstane (VI), 3(α and β),11β-dihydroxy-17-methylene-5β-androstane (VI), 3(α and β),11β-dihydroxy-17β-methyl-5β-androstane (VI), 3(α and β),11β-dihydroxy-17β-ethyl-5β-androstane (VI) and 3(α and β),11β-dihydroxy-17β-isopropyl-5β-androstane (VI).

The compounds of Formulae I to V, inclusive, can also be converted to their corresponding 11β-hydroxy-11α-alkyl counterparts embodied in Formula VI by chemical reduction, e.g., by reaction with an alkyl lithium such as methyl lithium, ethyl lithium, propyl lithium, etc. Employing this procedure yields, e.g., 3(α and β),11β-dihydroxy-11α-alkyl-5β-androstane (VI), 3(α and β),11β-dihydroxy-11α-alkyl-17-methylene-5β-androstane (VI), 3(α and β),11β-dihydroxy-11α-alkyl-17β-methyl-5β-androstane (VI), 3(α and β),11β-dihydroxy-11α-alkyl-17β-ethyl-5β-androstane (VI) and 3(α and β),11β-dihydroxy-11α-alkyl-17β-isopropyl-5β-androstane (VI).

The 3(α and β)-hydroxy compound represented by Formulae I to VI, inclusive, can be readily converted by conventional methods to their corresponding 3(α and β)-acylates (VII), e.g., by reaction with the anhydride of an organic carboxylic acid (such as acetic anhydride) in a mutual solvent, advantageously, an organic base such as pyridine, lutidine or collidine.

The 3(α and β)-hydroxy compounds embraced by Formulae I to VI, inclusive, are readily oxidized at the 3-position, e.g., by reaction with chromic acid in acetone, to yield the corresponding 3-keto analogues (VIII) such as 5β-androstane-3,11-dione (VIII), 17-methylene-5β-androstane-3,11-dione (VIII), 17β-methyl-5β-androstane-3,11-dione (VIII), etc.

The compounds represented by Formula VIII can be reduced at the 3-position, e.g., with hydrogen in the presence of a hydrogenation catalyst such as Raney nickel to yield the corresponding 3β-hydroxy compounds of Formulae I to VI, inclusive; employing this procedure is productive of compounds such as 3β-hydroxy-5β-androstan-11-one (I), 3β-hydroxy-17-methylene-5β-androstan-11-one (II), 3β-hydroxy-17β-methyl-5β-androstan-11-one (III), 3β-hydroxy-17β-ethyl-5β-androstan-11-one (IV), 3β-hydroxy-17β-isopropyl-5β-androstan-11-one (V), 3β,11β-dihydroxy-5β-androstane (VI), 3β,11β-dihydroxy-17β-methyl-5β-androstane (VI), and 3β,11β-dihydroxy-11α,17β-dimethyl-5β-androstane (VI).

All of the compounds embraced by Formulae I through VIII can be isolated from their respective reaction mixtures by conventional means, for example, when a water-miscible solvent is used, by pouring the reaction mixture into water and separating the resultant precipitate by filtration. Additional purification of the product can be accomplished by conventional methods, for example, by single solvent elution chromatography from an adsorbent column with a suitable solvent, such as, acetone, methanol, dilute methanol, ethanol, ethylene chloride; also by gradient elution chromatography from an adsorbent column with a suitable mixture of solvents, such as, methylene chloride-Skellysolve B (hexanes), acetone-Skellysolve B, and the like.

EXAMPLE 1

*3α-Hydroxy-5β-Androstan-11-One (I)*

A mixture comprising 5 g. of 3α-hydroxy-5β androstane-11,17-dione (A) [J. Biol. Chem. 162, 601 (1946)], 100 ml. of diethylene glycol and 2.5 ml. of 99% hydrazine hydrate was heated to reflux for about 30 minutes. The condenser was then removed and the temperature allowed to rise until the distillate temperature was 200° C. The condenser was replaced and a reflux temperature of 200° C. maintained during a period of about 2 hours. The solution was cooled and then poured into about 1.5 l. of water. The product was isolated by extraction into methylene chloride and adsorbed on a column of Florisil (synthetic magnesium silicate). The product was eluted with 10% acetone-Skellysolve B. Evaporation of the solvent gave a crystalline solid. Recrystallization from Skellysolve B and acetone yielded long, colorless needles melting at 126.8 to 128.5° C. Recrystallization from Skellysolve B gave an analytical sample of 3α-hydroxy-5β-androstan-11-one (I) having a melting point of 130 to 131.0° C. and infrared absorption $\nu$ max. 3330, 1710 cm.$^{-1}$.

*Analysis.*—Calcd. for $C_{19}H_{30}O_2$: C, 78.57; H, 10.41. Found: C, 78.56; H, 10.49.

Following the procedure of Example 1, but substituting 3β-hydroxy-5β-androstane-11,17-dione [J. Biol. Chem. 229, 85 (1957)] (A) as starting material, yields 3β-hydroxy-5β-androstan-11-one (I).

EXAMPLE 2

*3α-Hydroxy-17-Methylene-5β-Androstan-11-One (II)*

A solution of 34 millimoles of triphenylphosphene methylene in ether was prepared by the method of Sondheimer et al. [J. Amer. chem. Soc. 79, 5029 (1951)] and 1.82 g. (6 millimoles) of 3α-hydroxy-5β-androstane-11,17-dione (A) in 50 ml. of purified tetrahydrofuran was added thereto. The suspension was stirred for a period of about 15 hours at room temperature. The ether was distilled and concurrently replaced with 200 ml. of tetrahydrofuran and the reaction mixture heated to reflux for about 6 hours, cooled, treated with saturated sodium ammonium chloride solution and 200 ml. of ether. The organic layer was separated, washed with saturated sodium chloride solution, dried over sodium sulfate and evaporated to dryness in vacuo. The residue was absorbed onto 65 g. of Florisil in methylene chloride and the product eluted with a mixture of 5% acetone and Skellysolve B to give 185 mg. of crystalline material. Recrystallization from acetone-Skellysolve B afforded rosettes of crystals melting at 144 to 146.5° C.; from this material there was prepared an anlytical sample of 3α-hydroxy-17-methylene-5β-androstan-11-one (II) with a melting point of 145 to 147° C., infrared absorption $\nu$ max. at 3260, 1705, 1655, 1170, 1075, 1053 and 1035 cm.$^{-1}$.

*Analysis.*—Calcd. for $C_{20}H_{30}O_2$: C, 79.42; H, 10.00. Found: C, 79.44; H, 10.00.

Following the procedure of Example 2, but substituting 3β-hydroxy-5β-androstane-11,17-dione (A) as starting material, yields 3β-hydroxy-17-methylene-5β-androstan-11-one (II).

EXAMPLE 3

*3α-Hydroxy-17β-Methyl-5β-Androstan-11-One (III)*

To a suspension of 1 g. of 3α-hydroxy-17-methylene-5β-androstan-11-one (II) (prepared as in Example 2) in 100 ml. of ethanol, 100 mg. of a catalyst comprising 5% palladium on carbon is added and the steroidal compound hydrogenated under low pressure until somewhat more than the theoretical quantity of hydrogen is absorbed. The catalyst is filtered off on a bed of Celite (diatomaceous earth) and the filtrate evaporated to dryness under reduced pressure. The residue is crystallized from a mixture of acetone and Skellysolve B giving a light, crystalline solid having infrared absorption $\nu$ max. at 3260 and 1705 cm.$^{-1}$.

Following the procedure of Example 3, but substituting 3β - hydroxy - 17 - methylene - 5β - androstan - 11 - one (II) as starting material, yields 3β-hydroxy-17β-methyl-5β-androstan-11-one (III).

EXAMPLE 4

*3α-Hydroxy-17β-Ethyl-5β-Androstan-11-One (IV)*

(a) Four grams of 3α-hydroxy-5β-pregnane-11,20-dione (B) [J. Amer. Chem. Soc. 74, 483 (1952)] was dissolved in 40 ml. of glacial acetic acid and treated with 15 ml. of ethanedithiol and 15 ml. of boron trifluoride etherate in 40 ml. of glacial acetic acid at room temperature for a period of about 16 hours. The solution was diluted with 50 ml. of water and the volatile components removed under reduced pressure, after which the residue was diluted to a volume of about 500 ml. with water and the product extracted into ether. The ether extracts were washed successively with dilute sodium hydroxide solution, saturated sodium chloride solution, dried with sodium sulfate and evaporated to dryness. Crystallization of this residue from acetone gave 2.14 g. of product melting at 171.5 to 174.5° C. Recrystallization afforded an analytical sample of 3α,hydroxy-5β-pregnane-11,20-dione 20-thioketal, 3-acetate with a melting point of 176.0 to 177.0° C. and infrared absorption ν max. at 1725 and 1696 cm.$^{-1}$.

*Analysis.*—Calcd. for $C_{25}H_{38}O_3S_2$: C, 66.62; H, 8.50; S, 14.23. Found: C, 66.58; H, 8.63; S, 14.18.

(*b*) One gram of 3α-hydroxy-5β-pregnane-11,20-dione, 20-thioketal, 3-acetate [from (*a*)] was dissolved in 50 ml. of alcohol; 15 ml. of water containing 1 g. of potassium carbonate was added thereto and the solution warmed on a steam bath for about 16 hours. Dilution with 125 ml. of hot water gave 950 mg. of a crystalline solid melting at 175.0 to 177° C. A sample was recrystallized twice for analysis to give 3α-hydroxy-5β-pregnane-11,20-dione, 20-thioketal (B1) with a melting point of 175.0 to 177.0° C. and infrared absorption ν max. at 3430, 3340 (shoulder) and 1688 cm.$^{-1}$.

*Analysis.*—Calcd. for $C_{23}H_{36}O_2S_2$: C, 67.59; H, 8.88; S, 15.69. Found: C, 67.53; H, 9.06; S, 15.55.

(*c*) Five grams of 3α-hydroxy-5β-pregnane-11,20-dione, 20-thioketal [from (*b*)] was dissolved in 200 ml. of alcohol containing 50 ml. of water and treated with about 15 g. of Raney nickel catalyst at reflux for about 4 hours. The catalyst was filtered, washed with alcohol and the filtrate concentrated to a volume of about 50 ml. when 3 g. of crystalline plates melting at 149 to 152° C. separated. Two recrystallizations of this material from a mixture of acetone, ethanol and water gave an analytical sample of 3α-hydroxy-17β-ethyl-5β-androstan-11-one (IV) with a melting point of 153.0 to 154.0° C. and infrared absorption ν max. 3270, 3190 (shoulder) and 1700 cm.$^{-1}$.

*Analysis.*—Calcd. for $C_{21}H_{34}O_2$: C, 79.19; H, 10.76. Found: C, 78.98; H, 10.87.

Following the procedure of Example 4 (*a*), (*b*) and (*c*), but substituting 3β-hydroxy-5β-pregnane-11,20-dione [Helv. Chim. Acta 27, 821 (1944)] (B) as starting material, yields 3β-hydroxy-17β-ethyl-5β-androstan-11-one (IV).

EXAMPLE 5

*3α-Hydroxy-20-Methylene-5β-Pregnan-11-One (B2)*

Following the procedure of Example 2, but substituting 3α-hydroxy-5β-pregnane-11,20-dione (B) as starting material, yields 3α-hydroxy-20-methylene-5β-pregnan-11-one (B2).

Following the procedure of Example 2, but substituting 3β-hydroxy-5β-pregnan-11,20-dione (B) as starting material, yields 3β-hydroxy-20-methylene-5β-pregnan-11-one (B2).

EXAMPLE 6

*3α-Hydroxy-17β-Isopropyl-5β-Androstan-11-One (V)*

Following the procedure of Example 3, but substituting 3α-hydroxy-20-methylene-5β-pregnan-11-one (B2) (prepared as in Example 5) as starting material, yields 3α-hydroxy-17β-isopropyl-5β-androstan-11-one (V).

Following the procedure of Example 3, but substituting 3β-hydroxy-20-methylene-5β-pregnan-11-one (B2) as starting material, yields 3β-hydroxy-17β-isopropyl-5β-androstan-11-one (V).

EXAMPLE 7

*3α,11β-Dihydroxy-5β-Androstane (VI)*

One gram of 3α-hydroxy-5β-androstan-11-one (I) (from Example 1) is dissolved in 20 ml. of isopropyl alcohol at reflux and treated with 1 g. of sodium borohydride dissolved in 5 ml. of 0.1 N sodium hydroxide solution; the resulting solution is heated at reflux for a period of about 16 hours. The excess sodium borohydride is decomposed by the addition of an excess of acetic acid and the resulting mixture poured into about 10 volumes of water. The product is isolated, washed, dried, dissolved in methylene chloride, adsorbed on a column of Florisil and purified by gradient elution with acetone-Skellysolve B (5 to 25% acetone), to yield 3α,11β-dihydroxy-5β-androstane (VI).

Following the procedure of Example 7, but substituting as starting material the following:

(1) 3β-hydroxy-5β-androstan-11-one (I),
(2) 3α-hydroxy-17-methylene-5β-androstan-11-one (II),
(3) 3β-hydroxy-17-methylene-5β-androstan-11-one (II),
(4) 3α-hydroxy-17β-methyl-5β-androstan-11-one (III),
(5) 3β-hydroxy-17β-methyl-5β-androstan-11-one (III),
(6) 3α-hydroxy-17β-ethyl-5β-androstan-11-one (IV),
(7) 3β-hydroxy-17β-ethyl-5β-androstan-11-one (IV),
(8) 3α-hydroxy-17β-isopropyl-5β-androstan-11-one (V), and
(9) 3β-hydroxy-17β-isopropyl-5β-androstan-11-one (V), yields, respectively, (1) 3β,11β-dihydroxy-5β-androstane (VI),
(2) 3α,11β-dihydroxy-17-methylene-5β-androstane (VI),
(3) 3β,11β-dihydroxy-17-methylene-5β-androstane (VI),
(4) 3α,11β-dihydroxy-17β-methyl-5β-androstane (VI),
(5) 3β,11β-dihydroxy-17β-methyl-5β-androstane (VI),
(6) 3α,11β-dihydroxy-17β-ethyl-5β-androstane (VI),
(7) 3β,11β-dihydroxy-17β-ethyl-5β-androstane (VI),
(8) 3α,11β-dihydroxy-17β-isopropyl-5β-androstane (VI) and
(9) 3β,11β-dihydroxy-17β-isopropyl-5β-androstane (VI).

EXAMPLE 8

*3α,11β-Dihydroxy-11α-Methyl-17β-Ethyl-5β-Androstane (VI)*

Four grams of 3α-hydroxy-17β-ethyl-5β-androstan-11-one (VI) (from Example 4) dissolved in 100 ml. of dry benzene and 100 ml. of ether was treated with a solution of methyl lithium at 0° C. prepared from 9.5 g. of methyl bromide and 1.33 g. of lithium in 200 ml. of ether, then allowed to warm to room temperature over a period of about 16 hours. The excess methyl lithium was decomposed by the addition of water. The organic layer was separated, washed with water, saturated sodium chloride solution, dried with sodium sulfate and evaporated under reduced pressure to give a gummy product; the product exhibited no C=O (carbonyl) chromophore in its infrared absorption spectrum. This material in methylene chloride was adsorbed onto a column of 125 g. of Florisil and eluted over 15 fractions with a gradient of from 2 to 10% acetone in Skellysolve B. Fractions 3 to 7 contained 3.7 g. of 3α,11β-dihydroxy-11α-methyl-17β-ethyl-5β-androstane (VI) and showed an infrared absorption spectrum in agreement with its expected structure.

Following the procedure of Example 8, but substituting for methyl lithium another lower-alkyl (e.g., ethyl, propyl, butyl, etc.) lithium yields the corresponding 3α,11β-dihydroxy-11α-lower-alkyl-17β-ethyl-5β-andostane (IV).

Following the procedure of Example 8, but substituting as starting material the following:

(1) 3β-hydroxy-17β-ethyl-5β-androstan-11-one (IV).
(2) 3α-hydroxy-5β-androstan-11-one (I),
(3) 3β-hydroxy-5β-andostan-11-one (I),
(4) 3α-hydroxy-17-methylene-5β-androstan-11-one (II),
(5) 3β-hydroxy-17-methylene-5β-androstan-11-one (II),
(6) 3α-hydroxy-17β-methyl-5β-androstan-11-one (III),
(7) 3β-hydroxy-17β-methyl-5β-androstan-11-one (III),
(8) 3α-hydroxy-17β-isopropyl-5β-androstan-11-one (V), and
(9) 3β-hydroxy-17β-isopropyl-5β-androstan-11-one (V), yields, respectively, (1) 3β,11β-dihydroxy-11α-methyl-17β-ethyl-5β-androstane (VI),
(2) 3α,11β-dihydroxy-11α-methyl-5β-androstan (VI),
(3) 3β,11β-dihydroxy-11α-methyl-5β-androstane (VI),
(4) 3α,11β-dihydroxy-11α-methyl-17-methylene-5β-androstane (VI),
(5) 3β,11β-dihydroxy-11α-methyl-17-methylene-5β-androstane (VI),
(6) 3α,11β-dihydroxy-11α-methyl-17β-methyl-5β-androstane (VI), (7) 3β,11β-dihydroxy-11α-methyl-17β-methyl-5β-androstane (VI),
(8) 3α,11β-dihydroxy-11α-methyl-17β-isopropyl-5β-androstane (VI), and
(9) 3β,11β-dihydroxy-11α-methyl-17β-isopropyl-5β-androstane (VI).

Following the procedure of Example 8, but substituting for methyl lithium another lower-alkyl (e.g., ethyl, propyl, butyl, etc.) lithium yields the corresponding 3(α or β),11β-dihydroxy-11α-lower-alkyl compounds of (1) to (9), above.

EXAMPLE 9

3α,11β-Dihydroxy-11α-Methyl-17β-Ethyl-5β-Androstane 3-Acetate (VII)

A solution was prepared from 3.7 g. of 3α,11β-dihydroxy-11α-methyl-17β-ethyl-5β-androstane (VI) (prepared as in Example 8) in 8 ml. of pyridine and 4 ml. of acetic anhydride. The solution was warmed on a steam bath for about 20 minutes, then allowed to stand at room temperature for a period of about 16 hours. The solution was then diluted to a volume of about 50 ml. with water and the precipitate that resulted washed with water. The solid was dissolved in ethanol and crystallized from a mixture of ethanol and water to give 2.63 g. of product melting at 96.5 to 98° C. Recrystallization afforded an analytical sample of 3β,11β-dihydroxy-11α-methyl-17β-ethyl-5β-androstane 3-acetate (VIII) with a melting point of 98.0 to 99.0° C. with infrared absorption ν max. 3480, 1740 (shoulder), 1720 and 1265 cm.$^{-1}$.

*Analysis.*—Calcd. for $C_{24}H_{40}O_3$: C, 76.55; H, 10.71. Found: C, 76.25; H, 10.28.

Following the procedure of Example 9, but substituting another 3α,11β-dihydroxy-11α-lower-alkyl-17β-ethyl-5β-androstane (VI) as starting material, yields the corresponding 3-acetate thereof (VII).

Following the procedure of Example 9 but substituting for acetic anhydride another lower-hydrocarbon carboxylic acid anhydride, is productive of other 3(α and β), 11β-dihydroxy-11α-lower-alkyl-3-acylates (VII) wherein the acyl radical of the acylate group is the acyl radical of, for example, a lower-aliphatic acid, e.g., formic (formic acid plus acetic anhydride), propionic, butyric, isobutyric, caproic, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, methylbenzoic, dimethylbenzoic, ethylbenzoic, trimethylbenzoic, α-naphthoic, 3-methyl-α-naphthoic, an aralkyl acid, e.g., phenylacetic, phenylpropionic, diphenylacetic, and triphenylacetic acid.

Following the procedure of Example 9, but substituting as starting material:

(1) 3β,11β-dihydroxy-11α-methyl-17β-ethyl-5β-androstane (VI),
(2) 3α,11β-dihydroxy-11α-methyl-5β-androstane (VI),
(3) 3β,11β-dihydroxy-11α-methyl-5β-androstane (VI),
(4) 3α,11β-dihydroxy-11α-methyl-17-methylene-5β-androstane (VI),
(5) 3β,11β-dihydroxy-11α-methyl-17-methylene-5β-androstane (VI),
(6) 3α,11β-dihydroxy-11α-methyl-17β-methyl-5β-androstane (VI),
(7) 3β,11β-dihydroxy-11α-methyl-17β-methyl-5β-androstane (VI),
(8) 3α,11β-dihydroxy-11α-methyl-17β-isopropyl-5β-androstane (VI), and
(9) 3β,11β-dihydroxy-11α-methyl-17β-isopropyl-5β-androstane (VI), yields, respectively, the corresponding 3(α or β),11β-dihydroxy-11α-methyl 3-acylates (VII) of the compounds of (1) to (9), immediately above.

EXAMPLE 10

3α,11β-Dihydroxy-5β-Androstan-3-Acetate (VII)

Following the procedure of Example 9, but substituting as starting material the following:

(1) 3α,11β-dihydroxy-5β-androstane (VI),
(2) 3β,11β-dihydroxy-5β-androstane (VI),
(3) 3α,11β-dihydroxy-17-methylene-5β-androstane (VI),
(4) 3β,11β-dihydroxy-17-methylene-5β-androstane (VI),
(5) 3α,11β-dihydroxy-17β-methyl-5β-androstane (VI),
(6) 3β,11β-dihydroxy-17β-methyl-5β-androstane (VI),
(7) 3α,11β-dihydroxy-17β-ethyl-5β-androstane (VI),
(8) 3β,11β-dihydroxy-17β-ethyl-5β-androstane (VI),
(9) 3α,11β-dihydroxy-17β-isopropyl-5β-androstane (VI), and
10) 3β,11β-dihydroxy-17β-isopropyl-5β-androstane (VI), yields, respectively, the corresponding 3(α and β)11β-dihydroxy 3-acylates (VII) of the compounds of (1) to (10) immediately above.

EXAMPLE 11

3(α and β)-Acylates (VII) of Compounds of Formulae I, II, III, IV and V of Flow-Sheet in Column 2

Following the procedure of Example 9, but substituting as starting material the following:

(1) 3α-hydroxy-5β-androstan-11-one (I),
(2) 3β-hydroxy-5β-androstan-11-one (I),
(3) 3α-hydroxy-17-methylene-5β-androstan-11-one (II),
(4) 3β-hydroxy-17-methylene-5β-androstan-11-one (II),
(5) 3α-hydroxy-17β-methyl-5β-androstan-11-one (III),
(6) 3β-hydroxy-17β-methyl-5β-androstan-11-one (III),
(7) 3α-hydroxy-17β-ethyl-5β-androstan-11-one (IV),
(8) 3β-hydroxy-17β-ethyl-5β-androstan-11-one (IV),
(9) 3α-hydroxy-17β-isopropyl-5β-androstan-11-one (V), and
(10) 3β-hydroxy-17β-isopropyl-5β-androstan-11-one (V), yields, respectively, the corresponding 3(α or β)-hydroxy 3-acylates (VII) of the compounds of (1) to (10), immediately above.

EXAMPLE 12

3α-Hydroxy-17β-Ethyl-5β-Androstan-11-One 3-Hydrogen Succinate (VII)

Two grams of 3α-hydroxy-17β-ethyl-5β-androstan-11-one (IV) [prepared as in Example 4 (c)] was dissolved in 25 ml. of pyridine along with 2 g. of succinic anhydride and the mixture heated to reflux for about 2 hours. After standing for about 16 hours at room temperature the solution was poured into 200 ml. of ice and water containing 15 ml. of concentrated sulfuric acid. The product was filtered, washed thoroughly with water and dried. Recrystallization from acetone-Skellysolve B after treatment with Darco (activated charcoal) gave 2 g. of product melting at 147.5 to 150° C. An analytical sample of this material was recrystallized from a mixture of acetone and Skellysolve B to give pure 3α-hydroxy-17β-ethyl-5β-androstan-11-one 3-hydrogen succinate (VII) melting at 149.5 to 150.5° C. with infrared absorption ν max. at 2660, 2580, 1740, 1708 and 1210 cm.$^{-1}$.

*Analysis.*—Calcd. for $C_{25}H_{38}O_5$: C, 71.74; H, 9.15. Found: C, 71.45; H, 9.20.

Following the procedure of Example 12, but substituting 3β-hydroxy-17β-ethyl-5β-androstan-11-one (IV) as starting material yields 3β-hydroxy-17β-ethyl-5β-androstan-11-one 3-hydrogen succinate (VII).

EXAMPLE 13

17β-Ethyl-5β-Androstane-3,11-Dione (VIII)

One gram of 3α-hydroxy-17β-ethyl-5β-androstan-11-one (IV) [from Example 4 (c)] was suspended in 20 ml. of acetone and treated with 1.1 ml. of 2.67 M Jones Reagent (sulfuric acid chromium trioxide/water) at 50° C. for about 10 minutes while being vigorously stirred. The reaction mixture was diluted and washed with water. The product was dried and purified by recrystallization from acetone-Skellysolve B to give 17β-ethyl-5β-androstane-3,11-dione (VIII) melting at 105 to 106° C.

Following the procedure of Example 13, but substituting as starting material the following:
(1) 3β-hydroxy-17β-ethyl-5β-androstane-11-one (IV),
(2) 3α-hydroxy-5β-androstan-11-one (I),
(3) 3β-hydroxy-5β-androstan-11-one (I),
(4) 3α-hydroxy-17-methylene-5β-androstan-11-one (II),
(5) 3β-hydroxy-17-methylene-5β-androstan-11-one (II),
(6) 3α-hydroxy-17β-methyl-5β-androstan-11-one (III),
(7) 3β-hydroxy-17β-methyl-5β-androstan-11-one (III),
(8) 3α-hydroxy-17β-isopropyl-5β-androstan-11-one (V), and
(9) 3β-hydroxy-17β-isopropyl-5β-androstan-11-one (V),
yields, respectively,
(1) 17β-ethyl-5β-androstane-3,11-dione (VIII)
(2) (3) 5β-androstane-3,11-dione (VIII),
(4) (5) 17-methylene-5β-androstane-3,11-dione (VIII),
(6) (7) 17β-methyl-5β-androstane-3,11-dione (VIII), and
(8) (9) 17β-isopropyl-5β-androstane-3,11-dione (VIII).

EXAMPLE 14

3β-Hydroxy-17β-Ethyl-5β-Androstan-11-One (IV)

One gram of 17β-ethyl-5β-androstane-3,11-dione (VIII) (from Example 13) is dissolved in 50 ml. of methanol, 2 g. of anhydrous Raney nickel (under 2 ml. of methanol) is added thereto and the compound (VIII) hydrogenated until 1 mole of hydrogen is absorbed. The catalyst is filtered and the filtrate evaporated to dryness. The product is then purified by (1) recrystallization from an organic solvent, or (2) by chromatography on Florisil, or a combination of these two methods, to give 3β-hydroxy-17β-ethyl-5β-androstan-11-one (IV).

Following the procedure of Example 14, but substituting as starting material the following:
(1) 5β-androstane-3,11-dione (VIII),
(2) 17-methylene-5β-androstane-3,11-dione (VIII),
(3) 17β-methyl-5β-androstane-3,11-dione (VIII),
(4) 17β-isopropyl-5β-androstane-3,11-dione (VIII),
(5) 11β-hydroxy-5β-androstane-3-one (VIII),
(6) 11β-hydroxy-17-methylene-5β-androstane-3-one (VI),
(7) 11β-hydroxy-17β-methyl-5β-androstane-3-one (VI),
(8) 11β-hydroxy-17β-ethyl-5β-androstane-3-one (VI),
(9) 11β-hydroxy-11α-methyl-5β-androstane-3-one (VI),
(10) 11β-hydroxy-11α-methyl-17-methylene-5β-androstane-3-one (VI),
(11) 11β-hydroxy-11α,17β-dimethyl-5β-androstane-3-one (VI),
(12) 11β-hydroxy-11α-methyl-17β-ethyl-5β-androstane-3-one (VI), and
(13) 11β-hydroxy-11α-methyl-17β-isopropyl-5β-androstane-3-one (VI),
yields, respectively,
(1) 3β-hydroxy-5β-androstane-11-one (I),
(2) 3β-hydroxy-17-methylene-5β-androstan-11-one (II),
(3) 3β-hydroxy-17β-methyl-5β-androstan-11-one (III),
(5) 3β-hydroxy-17β-isopropyl-5β-androstan-11-one (V),
(5) 3β,11β-dihydroxy-17-methylene-5β-androstane (VI),
(6) 3β,11β-dihydroxy-17-methylene-5β-androstane (VI),
(7) 3β,11β-dihydroxy-17β-methyl-5β-androstane (VI),
(8) 3β,11β-dihydroxy-17β-isopropyl-5β-androstane (VI),
(9) 3β,11β-dihydroxy-11α-methyl-5β-androstane (VI),
(10) 3β,11β-dihydroxy-11α-methyl-17-methylene-5β-androstane (VI),
(11) 3β,11β-dihydroxy-11α,17β-dimethyl-5β-androstane (VI),
(12) 3β,11β-dihydroxy-11α-methyl-17β-ethyl-5β-androstane (VI), and
(13) 3β,11β-dihydroxy-11α-methyl-17β-isopropyl-5β-androstane (VI).

I claim:
1. Compounds of the formula

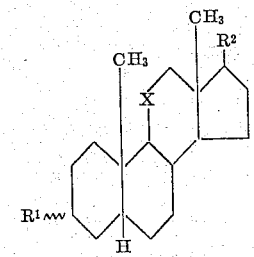

wherein R¹ is selected from the group consisting of

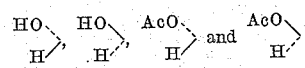

wherein Ac is the acyl radical of a hydrocarbon carboxylic acid containing from one to twelve carbon atoms, inclusive, and keto; ∼ is a generic expression applicable to the 3-hydroxy and 3-acyloxy substituents and denotes α- and β-bonds and mixtures thereof, with the proviso that when the 3-substituent is keto, there is a double bond at the 3-position without stereoconfiguration; R² is selected from the group consisting of methylene, methyl, ethyl and isopropyl; X is selected from the group consisting of the β-hydroxymethylene radical

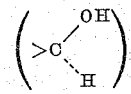

the β-hydroxy-α-methylmethylene radical

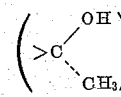

and the carbonyl radical (>C=O).

2. 3α-hydroxy-17β-methyl-5β-androstan-11-one.
3. 3α-hydroxy-17β-methyl-5β-androstan-11-one, 3-acetate.
4. 3α-hydroxy-17-methylene-5β-androstan-11-one.
5. 3α-hydroxy-17-methylene-5β-androstan-11-one, 3-acetate.
6. 3α-hydroxy-17β-ethyl-5β-androstan-11-one.
7. 3α-hydroxy-17β-ethyl-5β-androsten-11-one, 3-acetate.
8. 3α-hydroxy-17β-ethyl-5β-androsten-11-one, 3-propionate.
9. 3α-hydroxy-17β-ethyl-5β-androsten-11-one, 3-hemisuccinate.
10. 3α,11β-dihydroxy-11α-methyl-17β-ethyl-5β-androstane.
11. 3α,11β-dihydroxy-11α-methyl-17β-ethyl-5β-androstane, 3-acetate.
12. 3α-hydroxy-17β-isopropyl-5β-androstan-11-one.
13. 3α-hydroxy-17β-isopropyl-5β-androstan-11-one, 3-acetate.
14. 17β-ethyl-5β-androstane-3,11-dione.
15. A process for the production of a compound of the Formula II

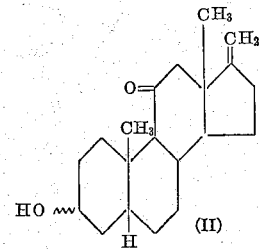

wherein ~ is a generic expression denoting α- and β-bonds and mixtures thereof, which comprises subjecting to the Witting reaction a compound of the formula A

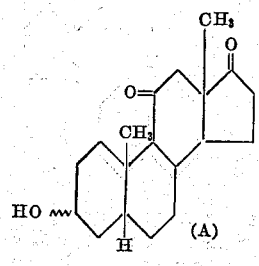

wherein ~ has the same meaning as above.

16. A process for the production of a compound of the Formula III

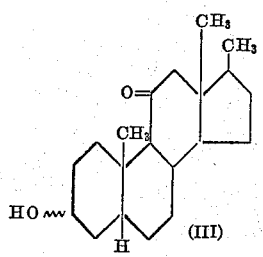

wherein ~ is a generic expression denoting α- and β-bonds and mixtures thereof, which comprises subjecting to the Wittig reaction, a compound of the Formula A

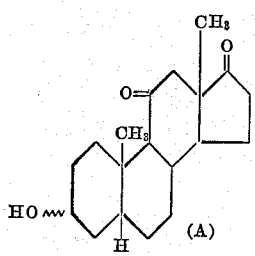

wherein ~ has the same meaning as above, to give a compound of the Formula II

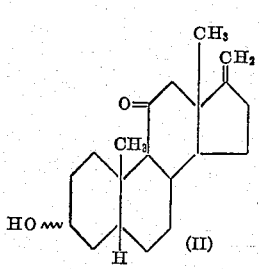

wherein ~ has the same meaning as above, and reducing a thus-produced compound of Formula II to give a compound of Formula III, above.

17. A process for the production of a compound of

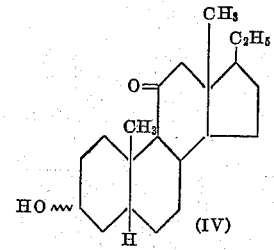

wherein ~ is a generic expression denoting α- and β-bonds and mixtures thereof, which comprises subjecting to thioketalization a compound of the Formula B

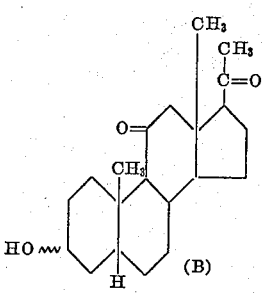

wherein ~ has the same meaning as above, to give a compound of the Formula B1

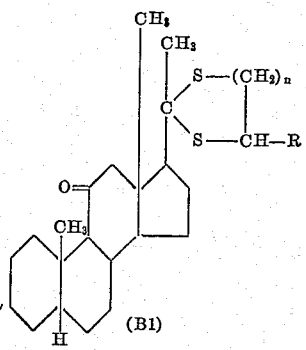

wherein ~ has the same meaning as above, $n$ is selected from the group consisting of the integers one and two, and R is selected from the group consisting of hydrogen and a lower-alkyl radical containing from one to six carbon atoms, inclusive, and subjecting a thus-produced compound of Formula B1 to the Mozingo desulfurization reaction to yield a compound of Formula IV, above.

18. A process for the production of a compound of the formula

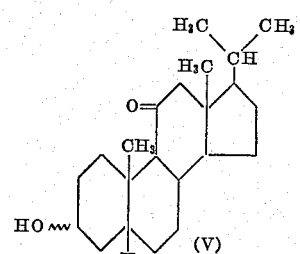

wherein ~ is a generic expression denoting α- and β-bonds and mixtures thereof, which comprises subjecting to the Wittig reaction a compound of the Formula B

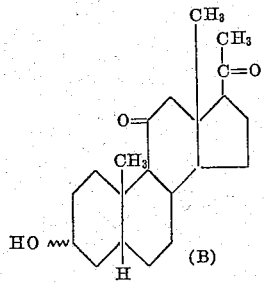

wherein ~ has the same meaning as above, to give a compound of the Formula B2

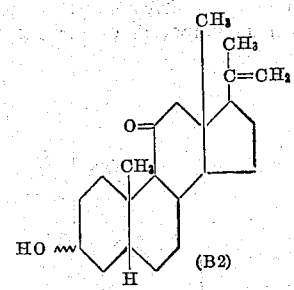

wherein ~ has the same meaning as above, and subjecting a thus-produced compound of Formula B2 to reduction to yield a compound of Formula V, above.

References Cited in the file of this patent

Fonken: Journ. Org. Chem. (1958), pages 1075–1077 relied on.
Mateos: Journ. Org. Chem. (1959), pages 2034–2035 relied on.

UNITED STATES PATENT OFFICE
CERTIFICATE OF CORRECTION

Patent No. 3,132,160  May 5, 1964

William J. Wechter

It is hereby certified that error appears in the above numbered patent requiring correction and that the said Letters Patent should read as corrected below.

Column 3, line 72, for "3b-hydroxy" read -- 3β-hydroxy --; column 5, line 12, for "compound" read -- compounds --; line 56, for "5βandrostane-" read -- 5β-androstane- --; column 6, line 12, for "chem." read -- Chem. --; column 8, line 57, for "-andostan-" read -- -androstan- --; column 9, line 28, for "(VIII)"read -- (VII) --; column 10, line 16, for "10)" read -- (10) --; column 12, lines 49, 51 and 53, for "-androsten-", each occurrence, read -- -androstan- --; column 13, line 3, for "Witting" read -- Wittig --; column 14, line 1, after "of" insert -- the formula (IV) --; line 62, after "formula" insert -- (V) --.

Signed and sealed this 3rd day of November 1964.

(SEAL)
Attest:

ERNEST W. SWIDER
Attesting Officer

EDWARD J. BRENNER
Commissioner of Patents